(12) United States Patent
Yeo et al.

(10) Patent No.: US 10,971,710 B2
(45) Date of Patent: Apr. 6, 2021

(54) ALL-SOLID BATTERY AND METHOD OF MANUFACTURING THE SAME

(71) Applicants: HYUNDAI MOTOR COMPANY, Seoul (KR); KIA MOTORS CORPORATION, Seoul (KR)

(72) Inventors: Yeol Mae Yeo, Anseong-si (KR); Ki Seok Koh, Suwon-si (KR); Yoon Sung Lee, Suwon-si (KR); Seung Min Oh, Incheon (KR); Hong Seok Min, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 238 days.

(21) Appl. No.: 16/157,910

(22) Filed: Oct. 11, 2018

(65) Prior Publication Data
US 2019/0157648 A1     May 23, 2019

(30) Foreign Application Priority Data

Nov. 17, 2017    (KR) .................... 10-2017-0153857

(51) Int. Cl.
| | |
|---|---|
| *H01M 2/16* | (2006.01) |
| *H01M 10/0585* | (2010.01) |
| *H01M 4/04* | (2006.01) |
| *H01M 10/0562* | (2010.01) |
| *H01M 10/04* | (2006.01) |
| *H01M 2/14* | (2006.01) |

(Continued)

(52) U.S. Cl.
CPC .......... *H01M 2/1653* (2013.01); *H01M 2/145* (2013.01); *H01M 4/0404* (2013.01); *H01M 10/04* (2013.01); *H01M 10/0525* (2013.01); *H01M 10/0562* (2013.01); *H01M 10/0585* (2013.01); *H01M 2004/021* (2013.01); *H01M 2300/0065* (2013.01)

(58) Field of Classification Search
CPC .. H01M 2/16; H01M 4/0404; H01M 10/0565; H01M 2/165
See application file for complete search history.

(56) References Cited

U.S. PATENT DOCUMENTS 5,360,684 A * 11/1994 Duval .................... H01M 6/10
                                                           429/162
6,645,675 B1 * 11/2003 Munshi .................. H01B 1/122
                                                           252/62.2

(Continued)

FOREIGN PATENT DOCUMENTS

| EP | 1458037 A1 * | 9/2004 | .......... H01M 2/0202 |
|---|---|---|---|
| JP | 2015-076272 A | 4/2015 | |

(Continued)

*Primary Examiner* — Amanda C. Walke
(74) *Attorney, Agent, or Firm* — Morgan, Lewis & Bockius LLP

(57) ABSTRACT

A method of manufacturing the all-solid battery includes steps of: forming a cathode layer; forming an anode layer; forming an electrolyte layer between the cathode layer and the anode layer; and forming an insulation layer using a baroplastic polymer at an edge portion of the battery. The step of forming the insulation layer comprises: forming a coating layer through coating of the edge portion of the battery with the baroplastic polymer; and shaping the baroplastic polymer through pressing of the coating layer.

16 Claims, 4 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 7,678,860 | B2* | 3/2010 | Muramoto | C08J 5/2231 |
| | | | | 524/556 |
| 9,887,429 | B2* | 2/2018 | Shih | H01M 10/052 |
| 9,991,486 | B2* | 6/2018 | Berger | C25B 13/02 |
| 10,361,470 | B2* | 7/2019 | Kwon | H01M 2/0277 |
| 10,454,116 | B2* | 10/2019 | Ali | H01M 2/028 |
| 2004/0219428 | A1* | 11/2004 | Nagayama | H01M 4/387 |
| | | | | 429/218.1 |
| 2004/0234847 | A1* | 11/2004 | Mino | H01M 2/0202 |
| | | | | 429/175 |
| 2007/0073000 | A1* | 3/2007 | Mayes | C08L 51/006 |
| | | | | 525/191 |
| 2008/0032236 | A1* | 2/2008 | Wallace | H01M 10/0585 |
| | | | | 430/319 |
| 2012/0103714 | A1* | 5/2012 | Choi | B60K 1/04 |
| | | | | 180/68.5 |
| 2013/0164603 | A1* | 6/2013 | Suguro | H01M 2/0287 |
| | | | | 429/163 |
| 2013/0164607 | A1* | 6/2013 | Shih | H01M 10/0436 |
| | | | | 429/179 |
| 2013/0224596 | A1* | 8/2013 | Nakazawa | H01M 14/005 |
| | | | | 429/220 |
| 2014/0079992 | A1* | 3/2014 | Tanaka | H01M 10/0418 |
| | | | | 429/210 |
| 2016/0323568 | A1* | 11/2016 | Guido | H04N 13/324 |
| 2017/0207482 | A1* | 7/2017 | Tomura | H01M 10/0562 |
| 2018/0183108 | A1* | 6/2018 | Yeo | H01M 10/4235 |
| 2018/0233711 | A1* | 8/2018 | Kato | H01M 2/0287 |
| 2019/0140284 | A1* | 5/2019 | Fukatani | H01M 4/366 |
| 2019/0237720 | A1* | 8/2019 | Lucchesi | H01M 2/1077 |
| 2019/0280329 | A1* | 9/2019 | Waseda | H01M 10/0562 |

FOREIGN PATENT DOCUMENTS

| | | |
|---|---|---|
| JP | 2015-125893 A | 7/2015 |
| JP | 2018092772 A * | 6/2018 |

* cited by examiner

[FIG. 1]
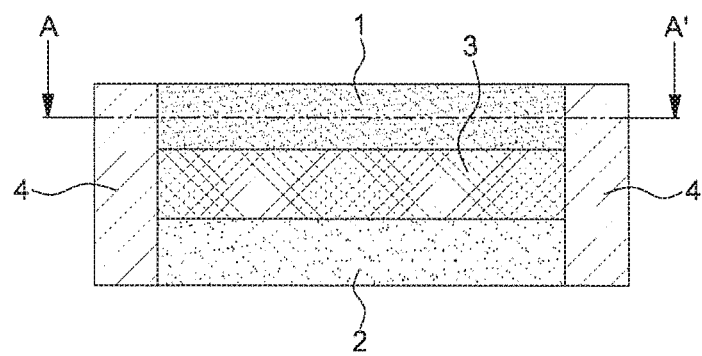
[FIG. 2]
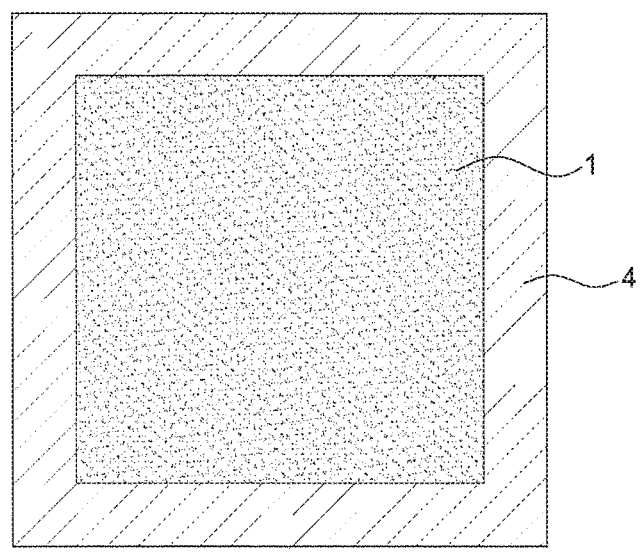

[FIG. 3]
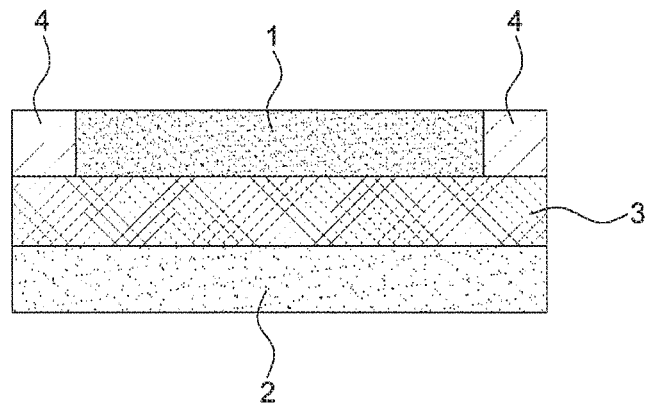
[FIG. 4]
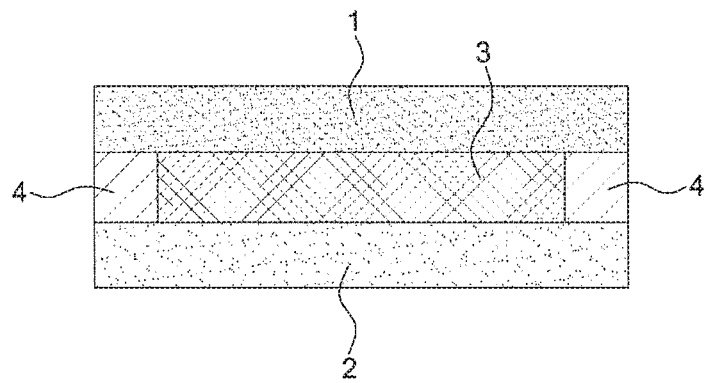
[FIG. 5]
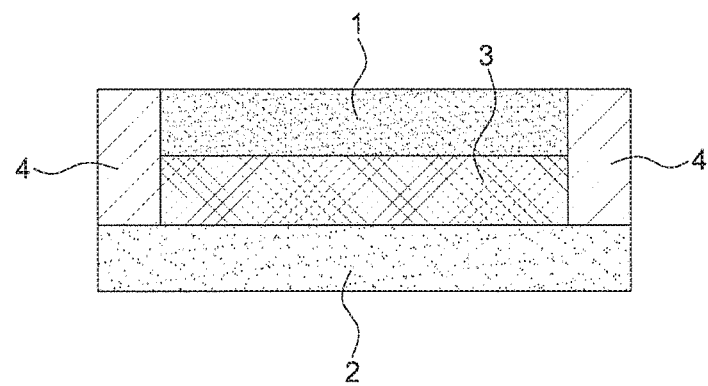

[FIG. 6A]
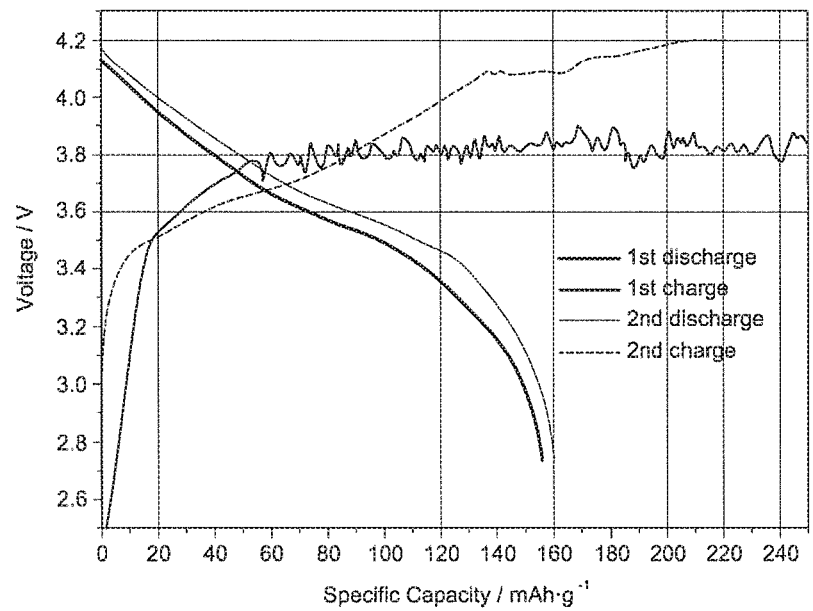
[FIG. 6B]
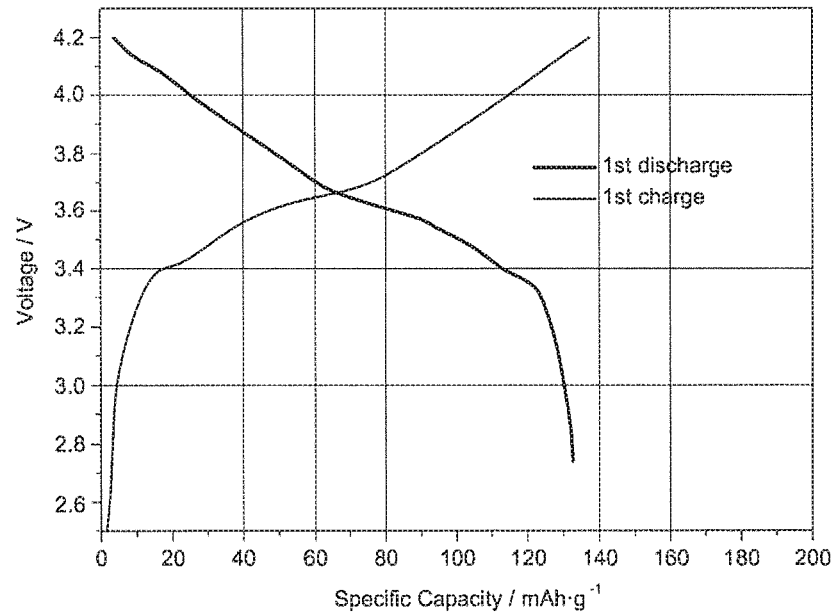

[FIG. 7]
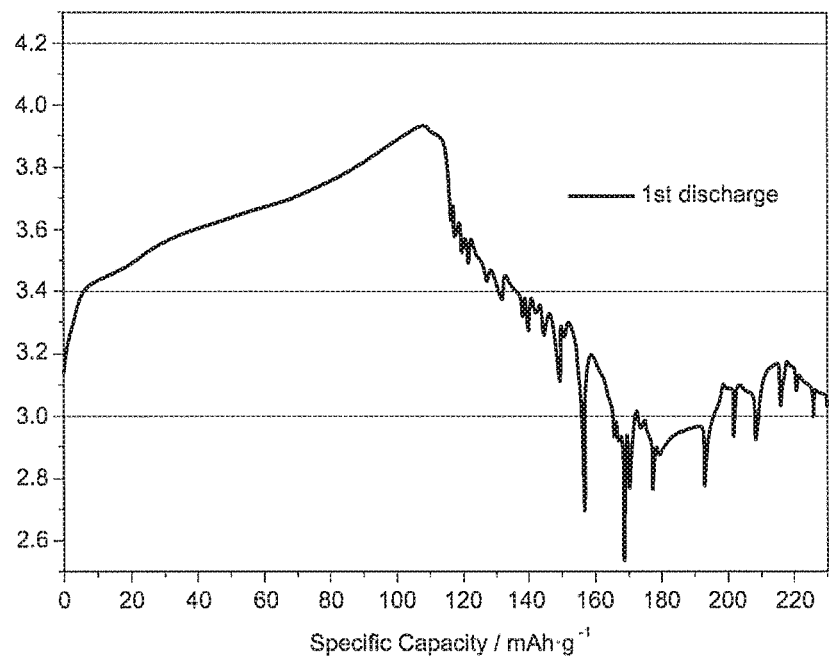

ALL-SOLID BATTERY AND METHOD OF MANUFACTURING THE SAME

CROSS-REFERENCE TO RELATED APPLICATION

This application claims, under 35 U.S.C. § 119(a), the benefit of priority to Korean Patent Application No. 10-2017-0153857 filed on Nov. 17, 2017, the entire contents of which are incorporated herein by reference.

TECHNICAL FIELD

The present disclosure relates to an all-solid battery and a method of manufacturing the same.

BACKGROUND

With the development and proliferation of vehicles using electrical energy, interest in safety-enhanced secondary batteries has been increasing. Since commercialized lithium ion secondary batteries use liquid electrolytes, which are volatile and heat-sensitive, the energy density of lithium ion secondary batteries gradually increases, but lithium ion secondary batteries always entail the risk of ignition and explosion. Hence, an all-solid battery having low explosion risk and high thermal stability has been receiving attention.

However, in manufacturing an all-solid battery, a pressing process must be applied in order to improve the contact between an all-solid electrolyte and an electrode. As such, an edge portion of the electrode is stripped during the high-pressure pressing process, which causes a short circuit of the battery. Accordingly, it is required to manufacture an all-solid battery, the insulation performance of the edge portion of which is ensured.

Techniques for ensuring insulation performance of an edge portion of an all-solid battery have been studied, in which an insulator is inserted into an electrode edge portion. However, such techniques cannot fundamentally solve the problem of short-circuiting of the edge portion because the edge portion is stripped and thus the insulator itself may break when the battery is subjected to pressure during the battery fabrication process.

Additionally, use of a pouch with tape has been proposed, whereby an electrode edge portion is attached to a tape to thus prevent a short-circuit fault from occurring, but the likelihood of a short-circuit fault remains high owing to the spacing between the pouch and the edge portion.

SUMMARY

The present disclosure has been made keeping in mind the problems encountered in the related art, and the present disclosure is intended to provide an all-solid battery and a method of manufacturing the same, in which an edge portion of the all-solid battery may be more effectively insulated.

Therefore, an exemplary embodiment of the present disclosure provides a method of manufacturing an all-solid battery, comprising steps of: forming a cathode layer, forming an anode layer; forming an electrolyte layer between the cathode layer and the anode layer; and forming an insulation layer using a baroplastic polymer at an edge portion of the battery.

The step of forming the insulation layer may include forming a coating layer through coating of the edge portion of the battery with the baroplastic polymer and shaping the baroplastic polymer through pressing of the coating layer.

The coating layer may include the baroplastic polymer alone, or may include a composite comprising the baroplastic polymer in combination with at least one selected from among a cathode material, an anode material and an all-solid electrolyte.

When the coating layer may include the composite comprising the baroplastic polymer in combination with at least one selected from among a cathode material, an anode material and an all-solid electrolyte, the baroplastic polymer may be contained in an amount of 50 volume % or more.

The baroplastic polymer may exhibit baroplasticity at 50° C. or less and may have an average particle size of 10-100 m.

The baroplastic polymer may include a mixture of at least two selected from the group consisting of polystyrene (PS), polyisoprene (PI), poly(n-butyl acrylate) (PBA), poly(2-ethylhexyl acrylate) (PEHA), poly(pentyl methacrylate) (PPMA), poly(butyl methacrylate) (PBMA), polycarbonate (PC), poly(methyl methacrylate) (PMMA), poly(vinyl chloride) (PVC), poly(ethyl acrylate) (PEA), poly(ethyl methacrylate) (PEMA), and polybutadiene (PB).

The step of forming the insulation layer may include sealing the battery, in which the edge portion is coated with the baroplastic polymer, in a pouch and pressing the sealed pouch at 3 ton/m$^2$ to 5 ton/m$^2$ to thus form the insulation layer.

The cathode layer, the electrolyte layer and the anode layer may have the same area as each other, and the insulation layer of the edge portion may be formed on an edge portion in the external direction of each of the cathode layer, the electrolyte layer and the anode layer.

The cathode layer may have a small area compared to the anode layer and the electrolyte layer, and the insulation layer of the edge portion may be formed on an edge portion of the cathode layer.

The anode layer may have a small area compared to the cathode layer and the electrolyte layer, and the insulation layer of the edge portion may be formed on an edge portion of the anode layer.

The electrolyte layer may have a small area compared to the anode layer and the cathode layer, and the insulation layer of the edge portion may be formed on an edge portion of the electrolyte layer.

The anode layer or the cathode layer may have a large area compared to the remaining layers, and the insulation layer of the edge portion may be formed on an edge portion of each of the remaining layers, which have a smaller area.

In addition, another exemplary embodiment of the present disclosure provides an all-solid battery, comprising: a cathode layer; an anode layer; and an electrolyte layer, wherein an insulation layer is formed using a baroplastic polymer at an edge portion of the battery.

The insulation layer may be manufactured by shaping the baroplastic polymer through pressing of a coating layer of the baroplastic polymer formed on the edge portion of the battery, and the insulation layer may include at least one of a cathode material, an anode material, and an all-solid electrolyte.

The cathode layer, the electrolyte layer and the anode layer may have the same area as each other, and the insulation layer of the edge portion may be formed on an edge portion in the external direction of each of the cathode layer, the electrolyte layer and the anode layer.

The cathode layer may have a small area compared to the anode layer and the electrolyte layer, and the insulation layer of the edge portion may be formed on an edge portion of the cathode layer.

The anode layer may have a small area compared to the cathode layer and the electrolyte layer, and the insulation layer of the edge portion may be formed on an edge portion of the anode layer.

The electrolyte layer may have a small area compared to the anode layer and the cathode layer, and the insulation layer of the edge portion may be formed on an edge portion of the electrolyte layer.

The anode layer or the cathode layer may have a large area compared to the remaining layers, and the insulation layer of the edge portion may be formed on an edge portion of each of the remaining layers, which have a smaller area.

According to the present disclosure, a short circuit of an edge portion of a battery can be fundamentally prevented from occurring as a result of breaking or stripping of electrodes, etc. by pressure during a pressing process at the time of battery fabrication.

In particular, according to the present disclosure, during isostatic pressing of the battery, an insulation layer of the edge portion can be formed using a baroplastic polymer, and thus, even when some of the electrodes are stripped in the pressing process, the baroplastic polymer is shaped in the state of being mixed with such stripped materials, thereby effectively preventing stripping of the electrode edge portion and thus short-circuiting of the battery during the pressing process.

BRIEF DESCRIPTION OF THE DRAWINGS

FIG. 1 schematically shows the configuration of an all-solid battery according to an exemplary embodiment of the present disclosure;

FIG. 2 is a cross-sectional view taken along the line A-A' in the all-solid battery of FIG. 1;

FIG. 3 is a cross-sectional view showing an all-solid battery according to another exemplary embodiment of the present disclosure;

FIG. 4 is a cross-sectional view showing an all-solid battery according to still another exemplary embodiment of the present disclosure;

FIG. 5 is a cross-sectional view showing an all-solid battery according to yet another exemplary embodiment of the present disclosure; and FIGS. 6A, 6B, and 7 show the results of charge-discharge measurement of batteries of Examples 1 and 2 and Comparative Example 1.

DESCRIPTION OF SPECIFIC EMBODIMENTS

Hereinafter, a detailed description will be given of exemplary embodiments of the present disclosure with reference to the appended drawings.

As shown in FIG. 1, an all-solid battery according to the present disclosure having a stacking structure in which an electrolyte layer is interposed between a cathode layer 1 and an anode layer 2, an edge portion of the battery has an insulation layer 4 using a baroplastic polymer material. Specifically, the method of manufacturing the all-solid battery according to the present disclosure includes forming a cathode layer 1 and an anode layer 2, forming an electrolyte layer 3 between the cathode layer 1 and the anode layer 2, coating the edge portion with a baroplastic polymer material, and placing the stacking battery structure in a pouch and performing vacuum sealing and pressing, thereby manufacturing an all-solid battery in which the edge portion is insulated.

Forming the cathode layer 1 or the anode layer 2 may be performed in a manner in which a current collector made of a metal, serving as a substrate, is coated with an anode composite slurry or a cathode composite slurry. The anode composite slurry contains an anode active material, which is typically used in the field of secondary batteries, such as silicon (Si), tin (Sn), or graphite. The cathode composite slurry contains a cathode active material, examples of the cathode active material including lithium nickel cobalt manganese (NCM)-based, lithium cobalt oxide (LCO)-based, lithium nickel cobalt aluminum (NCA)-based, and lithium iron phosphate (LFP)-based materials, which are typically used in the field of secondary batteries.

The anode composite and the cathode composite respectively contain an anode active material and a cathode active material in combination with a conductive additive and a binder, and each of the anode composite and the cathode composite may be applied in the form of a slurry. Here, the coating process may be performed using a process that is typically used in electrode coating, such as bar coating, gravure coating, or the like.

An electrolyte layer 3 is interposed between the cathode layer 1 and the anode layer 2, which are manufactured as above, and the electrolyte layer 3 may be formed by subjecting an all-solid electrolyte comprising a sulfide or oxide material having ionic conductivity of $10^{-3}$ s/cm or more to insertion through lamination or coating.

The edge portion of the battery comprising the cathode layer 1, the electrolyte layer 3, and the anode layer 2, which are stacked, is coated with a baroplastic polymer material.

In the present disclosure, the baroplastic polymer material may be a mixture in which the term for compressibility is negative in a compressible regular solution model.

The baroplastic polymer may have compatibility at 50° C. or less, and a baroplastic polymer powder has an average particle size of 10 to 100 µm.

The baroplastic polymer may be a mixture comprising at least two selected from among polystyrene (PS), polyisoprene (PI), poly(n-butyl acrylate) (PBA), poly(2-ethylhexyl acrylate) (PEHA), poly(pentyl methacrylate) (PPMA), poly(butyl methacrylate) (PBMA), polycarbonate (PC), poly(methyl methacrylate) (PMMA), poly(vinyl chloride) (PVC), poly(ethyl acrylate) (PEA), poly(ethyl methacrylate) (PEMA), and polybutadiene (PB), but is not limited thereto, so long as it is baroplastic under predetermined pressure.

In an exemplary embodiment of the present disclosure, the baroplastic polymer material is used to form the insulation layer 4 at the edge portion of the battery configured such that the cathode layer 1, the anode layer 2, and the electrolyte layer 3 are stacked. To this end, the baroplastic polymer material has to be positioned at the edge portion of the battery, and the baroplastic polymer material positioned at the edge portion is compressed under predetermined pressure, thus forming the insulation layer 4.

In an exemplary embodiment of the present disclosure, cold isostatic pressing is applied upon the fabrication of an all-solid battery. Thus, forming the insulation layer 4 by compressing the baroplastic polymer material may be carried out through cold isostatic pressing. In cold isostatic pressing, pressure is uniformly applied in all directions using a liquid at a low temperature.

For example, a pouch cell in which the stacked cell is placed in a pouch is positioned in a liquid-containing vessel, and pressure is uniformly applied to the pouch cell in all directions. Here, the term "cold" indicates a low-temperature condition, and indicates the temperature of the liquid contained in the vessel. Taking into consideration the typical pressure conditions in the cold isostatic pressing process, the baroplastic polymer may be a material having baroplasticity at 3 ton/m² to 5 ton/m².

The baroplastic polymer may be used in the form of a binder-baroplastic polymer solution, and the binder may be aqueous or non-aqueous.

Specifically, for cold isostatic pressing, the stacking battery structure is sealed in the pouch, after which the pouch is positioned in the liquid-containing vessel and cold isostatic pressing is performed. Here, the battery structure is subjected to uniform pressure in all directions in the vessel, and the electrode edge portion may be damaged by the applied pressure. According to the present disclosure, the edge portion is coated with the baroplastic polymer material, and thus the baroplastic polymer is shaped while being subjected to pressure.

In particular, according to the present disclosure, since the baroplastic polymer is shaped during the pressing process, even when the cathode layer, the anode layer, or the all-solid electrolyte layer 3 may break upon pressing, the baroplastic polymer is shaped together with the broken materials to thus form the insulation layer 4.

Thus, according to the present disclosure, even when the cathode, the anode, the all-solid electrolyte, etc. are broken by pressure, space between the broken materials is filled with the baroplastic polymer. Hence, even when the edge portion of the battery breaks due to the pressing process at high pressure, a short circuit of the battery may be prevented from occurring.

The baroplastic polymer may be used alone, or may be used in the form of a composite in combination with a cathode composite or an anode composite, in order to coat the edge portion of the battery, during the fabrication of the stacking structure configured such that the cathode layer, the anode layer and the electrolyte are stacked. Furthermore, coating 2) may be performed by further mixing the all-solid electrolyte, or using a composite comprising the baroplastic polymer and the all-solid electrolyte, which are mixed.

For example, in an exemplary embodiment of the present disclosure, the baroplastic polymer alone is applied on the edge portion of the battery, and is compressed under predetermined pressure, thus forming the insulation layer 4.

In a further embodiment of the present disclosure, a composite in which a baroplastic polymer and a cathode material or an anode material are mixed together may be applied on the edge portion of the battery, followed by cold isostatic pressing, thus forming an insulation layer 4. In still a further embodiment of the present disclosure, a composite in which at least two of a baroplastic polymer, a cathode material, an anode material and an all-solid electrolyte are mixed may be applied on the edge portion of the battery, thereby forming an insulation layer 4. In this case, in order to effectively insulate the edge portion, the baroplastic polymer material may be used in an amount of 50 volume % or more.

The coating of the edge portion of the battery for the insulation layer 4 including the baroplastic polymer material may be performed after coating and drying of the cathode layer, the anode layer and the all-solid electrolyte layer 3, but the present disclosure is not limited thereto. For example, the cathode layer, the anode layer and the all-solid electrolyte layer 3 are stacked, after which the coating with the baroplastic polymer material may be performed before the drying process, or the coating of the edge portion may be performed at the time of stacking of the all-solid battery.

According to the present disclosure, the position of the edge portion on which the insulation layer 4 is formed may be variously set.

FIG. 1 shows the configuration in which the insulation layer 4 is formed on the edge portion of each of the cathode layer 1, the electrolyte layer 3 and the anode layer 2 according to an exemplary embodiment of the present disclosure. As shown in FIG. 1, the cathode layer 1, the electrolyte layer 3 and the anode layer 2 are formed so as to have the same width and area, and the insulation layer 4 of the edge portion is formed on the edge portion in the external direction of each of the cathode layer 1, the electrolyte layer 3 and the anode layer 2, which is clearly depicted in the cross-sectional view of A-A' of FIG. 2. As shown in FIG. 2, the insulation layer 4 may be formed over the entire region of the edge portion along the outer rim of the stacking structure. FIG. 2 illustrates the rectangular battery structure, and the shape of the edge portion may vary depending on the shape of the battery. In the present disclosure, the area of the layer means a top surface area of the layer in a laminating direction.

As illustrated in FIG. 3, according to another embodiment of the present disclosure, the cathode layer 1 is formed so as to have a small width and area compared to the anode layer 2 and the electrolyte layer 3, and the insulation layer 4 is formed on an edge portion of the cathode layer 1. In this case, the coating of the insulation layer 4 offsets the insufficient area of the cathode layer 1, and thus respective areas of the stacked layers may be made uniform as a whole, as shown in FIG. 3.

Although not shown, unlike FIG. 3, the anode layer 2 may be formed so as to have a small width and area compared to the cathode layer 1 and the electrolyte layer 3, and the insulation layer 4 may be formed on an edge portion of the anode layer 2.

As illustrated in FIG. 4 according to still another embodiment of the present disclosure, the all-solid electrolyte layer 3 is formed so as to have a small width and area compared to the anode layer 2 and the cathode layer 1, and the insulation layer 4 may be formed on an edge portion of the all-solid electrolyte layer 3.

In yet another embodiment of the present disclosure, the anode layer 2 or the cathode layer 1 may have a large area compared to the remaining layers, and the insulation layer 4 may be formed on an edge portion of each of the remaining layers, which have a smaller area. For example, FIG. 5 shows the configuration according to yet another embodiment of the present disclosure, in which the cathode layer 1 and the all-solid electrolyte layer 3 have a small width and area compared to the anode layer 2, and the insulation layer 4 is formed on an edge portion of each of the cathode layer 1 and the all-solid electrolyte layer 3. On the other hand, unlike FIG. 5, the anode layer 2 and the all-solid electrolyte layer 3 may have a small width and area compared to the cathode layer 1, and the insulation layer 4 may be formed on an edge portion of each of the anode layer 2 and the all-solid electrolyte layer 3.

The embodiments of FIGS. 3 to 5 are different from the embodiment of FIG. 1 only in terms of the position of the insulation layer 4, and the overall manufacturing process thereof may be performed in the same manner.

Example 1

(1) Preparation of Baroplastic Polymer

A baroplastic polymer, which is a block copolymer (PPMA/PS) of polypentyl methacrylate (PPMA) and polystyrene (PS), was prepared using sodium dodecyl sulfate (SDS) as a surfactant, 2,2'-azobis(2-methylpropionamidine) dihydrochloride (V50) as an initiator, and pentyl methacrylate (PMA) and styrene as monomers. Here, xylene was used as a solvent. Upon synthesis, the weight ratio of PMA and styrene monomers was 1:1. The finally synthesized product was a 40 wt % polymer emulsion.

(2) Formation of Cathode

A cathode slurry was prepared using 83 wt % of $Li(Ni_{0.7}Co_{0.1}Mn_{0.1})O_2$ as a cathode active material, 3 wt % of carbon black and 1 wt % of graphite-based SFG6L (made by Timcal) as conductive additives, 3 wt % of nitrile-butadiene rubber (NBR) as a binder, 10% of 20 LiI.80(0.75 $Li_2S.0.25P_2S_5$)) as a sulfide solid electrolyte, and a xylene solvent. The cathode slurry was applied to a thickness of 100 μm on a piece of aluminum foil having a thickness of 15 μm and then dried in an oven at 120° C. for 30 min, thus manufacturing a cathode.

(3) Coating with Baroplastic Polymer

The PPMA/PS baroplastic polymer emulsion was applied to a thickness of 180 μm on the edge portion of the cathode manufactured above, and was then dried in an oven at 80° C. for 4 hr, thus manufacturing a cathode-baroplastic polymer composite electrode.

(4) Preparation of Anode/Solid Electrolyte Composite

An anode slurry was prepared using 84 wt % of natural graphite as an anode active material, 3 wt % of graphite-based SFG6L (made by Timcal) as a conductive additive, 3 wt % of NBR as a binder, 10% of 20 LiI.80(0.75 $Li_2S.0.25P_2S_5$) as a sulfide solid electrolyte, and a xylene solvent. The anode slurry was applied to a thickness of 100 μm on a piece of copper foil having a thickness of 12 μm. A slurry was prepared using 20 LiI.80(0.75 $Li_2S.0.25P_2S_5$) as a sulfide solid electrolyte and a xylene solvent and then applied to a thickness of 200 μm on the coated anode plate. The resulting anode/solid electrolyte composite was dried in an oven at 80° C. for 6 hr.

(5) Fabrication of Battery for Evaluation

The cathode and the anode/solid electrolyte composite were disposed to face each other and then compressed at 80 kgf or more using a roll press. Next, a pouch cell was fabricated using the stacking structure thus obtained, and was then subjected to cold isostatic pressing at a pressure of 3.5 ton.

Example 2

A battery for evaluation was manufactured in the same manner as in Example 1, with the exception that a mixed slurry comprising 90 wt % of a baroplastic polymer and 10 wt % of a cathode slurry was applied on the edge portion of the cathode.

Comparative Example 1

A battery for evaluation was manufactured in the same manner as in Example 1, with the exception that a baroplastic polymer was not used.

The batteries for evaluation of Examples 1 and 2 and Comparative Example 1 were subjected to charge-discharge testing. FIGS. 6A, 6B, and 7 show the results of charge-discharge measurement of the batteries of Examples 1 and 2 and Comparative Example 1.

The measurement was performed under conditions of room temperature, potential ranging from 2.75 V to 4.2 V, a current density of 0.1 mA/cm², and constant-current charge/discharge.

As shown in FIG. 7, a short circuit was confirmed in Comparative Example 1, and thus charging was not terminated. As shown in FIG. 6A, in Example 1, although it was confirmed that some leakage current was generated at the end of charging, charging and discharging were possible. As shown in FIG. 6B, in Example 2, one normal charge-discharge cycle was possible.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Also, many changes may be made to specific situations or materials within a range that does not depart from the essential scope of the present disclosure. Therefore, the present disclosure is not to be limited to the details of the exemplary embodiments thereof, but will include all embodiments within the scope of the appended claims.

What is claimed is:

1. A method of manufacturing an all-solid battery, comprising steps of:
    forming a cathode layer;
    forming an anode layer;
    forming an electrolyte layer between the cathode layer and the anode layer; and
    forming an insulation layer using a baroplastic polymer which comprises a mixture of at least two at an edge portion of the battery,
    wherein the step of forming the insulation layer comprises:
        forming a coating layer through coating of the edge portion of the battery with the baroplastic polymer; and
        shaping the baroplastic polymer through pressing of the coating layer,
    wherein the coating layer includes a composite comprising the baroplastic polymer in combination with at least one selected from among a cathode material, an anode material, or an all-solid electrolyte.

2. The method of claim 1, wherein, when the coating layer includes the composite comprising the baroplastic polymer in combination with at least one selected from among the cathode material, the anode material and the all-solid electrolyte, the baroplastic polymer is contained in an amount of 50 volume % or more.

3. The method of claim 1, wherein the baroplastic polymer exhibits baroplasticity at 50° C. or less and has an average diameter of 10-100 μm.

4. The method of claim 1, wherein the mixture of at least two of the baroplastic polymer is selected from the group consisting of polystyrene (PS), polyisoprene (PI), poly(n-butyl acrylate) (PBA), poly(2-ethylhexyl acrylate) (PEHA), poly(pentyl methacrylate) (PPMA), poly(butyl methacrylate) (PBMA), polycarbonate (PC), poly(methyl methacrylate) (PMMA), poly(vinyl chloride) (PVC), poly(ethyl acrylate) (PEA), poly(ethyl methacrylate) (PEMA), and polybutadiene (PB).

5. The method of claim 1, wherein the step of forming the insulation layer comprises:
    sealing the battery, in which the edge portion is coated with the baroplastic polymer, in a pouch; and
    pressing the sealed pouch at 3 ton/m² to 5 ton/m² to manufacture the insulation layer.

6. The method of claim 1, wherein the cathode layer, the electrolyte layer, and the anode layer have the same surface area as each other, and wherein the insulation layer is disposed on an entire edge portion of each of the cathode layer, the electrolyte layer, and the anode layer.

7. The method of claim 1, wherein the cathode layer has a smaller surface area than those of the anode layer and the electrolyte layer, and
wherein the insulation layer is disposed on an edge portion of the cathode layer.

8. The method of claim 1, wherein the anode layer has a smaller surface area than those of the cathode layer and the electrolyte layer, and
wherein the insulation layer is disposed on an edge portion of the anode layer.

9. The method of claim 1, wherein the electrolyte layer has a smaller surface area than those of the anode layer and the cathode layer, and
wherein the insulation layer is disposed on an edge portion of the electrolyte layer.

10. The method of claim 1, wherein the anode layer or the cathode layer has a larger surface area than those of remaining layers, and
wherein the insulation layer is disposed on an edge portion of each of the remaining layers.

11. An all-solid battery, comprising:
a cathode layer;
an anode layer; and
an electrolyte layer,
wherein an insulation layer includes a baroplastic polymer at an edge portion of the battery,
wherein the insulation layer is manufactured by pressing of a coating layer of the baroplastic polymer disposed on the edge portion of the battery, and
wherein the coating layer includes a composite comprising the baroplastic polymer in combination with at least one selected from among a cathode material, an anode material, or an all-solid electrolyte.

12. The all-solid battery of claim 11, wherein the cathode layer, the electrolyte layer, and the anode layer have the same surface area as each other, and
wherein the insulation layer is disposed on an entire edge portion of each of the cathode layer, the electrolyte layer, and the anode layer.

13. The all-solid battery of claim 11, wherein the cathode layer has a smaller surface area that those of the anode layer and the electrolyte layer, and
wherein the insulation layer is disposed on an edge portion of the cathode layer.

14. The all-solid battery of claim 11, wherein the anode layer has a smaller surface area than those of the cathode layer and the electrolyte layer, and
wherein the insulation layer is disposed on an edge portion of the anode layer.

15. The all-solid battery of claim 11, wherein the electrolyte layer has a smaller surface area than those of the anode layer and the cathode layer, and
wherein the insulation layer is disposed on an edge portion of the electrolyte layer.

16. The all-solid battery of claim 11, wherein the anode layer or the cathode layer has a larger surface area than those of remaining layers, and
wherein the insulation layer is disposed on an edge portion of each of the remaining layers.

* * * * *